United States Patent
Shah (10) Patent No.: US 9,809,718 B1
(45) Date of Patent: Nov. 7, 2017

(54) LARGE PARTICLE SIZE MULTICOLOR PAINT

(71) Applicant: Seagrave Coatings Corp., Kenilworth, NJ (US)

(72) Inventor: Rohit Shah, Edison, NJ (US)

( * ) Notice: Subject to any disclaimer, the term of this patent is extended or adjusted under 35 U.S.C. 154(b) by 0 days.

(21) Appl. No.: 15/011,764

(22) Filed: Feb. 1, 2016

Related U.S. Application Data (60) Provisional application No. 62/111,438, filed on Feb. 3, 2015.

(51) Int. Cl.
*C09D 125/14* (2006.01)
*C09D 5/29* (2006.01)
*C09D 133/08* (2006.01)
*B05D 5/06* (2006.01)

(52) U.S. Cl.
CPC .............. *C09D 5/29* (2013.01); *B05D 5/06* (2013.01); *C09D 125/14* (2013.01); *C09D 133/08* (2013.01)

(58) Field of Classification Search
CPC ...... C09D 5/29; C09D 133/08; C09D 125/14; B05D 5/06
See application file for complete search history.

(56) References Cited

U.S. PATENT DOCUMENTS

| | | | | |
|---|---|---|---|---|
| 3,852,076 A | * | 12/1974 | Grasko | B01J 13/02 106/287.17 |
| 3,950,283 A | * | 4/1976 | Sellars | C09D 5/29 106/197.01 |
| 4,376,654 A | * | 3/1983 | Zola | B01J 13/10 106/163.01 |
| 5,114,481 A | | 5/1992 | Lynch | |
| 5,114,484 A | | 5/1992 | Lynch | |
| 5,114,485 A | | 5/1992 | Lynch et al. | |
| 5,199,980 A | | 4/1993 | Lynch et al. | |
| 5,314,535 A | | 5/1994 | Lynch et al. | |
| 5,318,619 A | | 6/1994 | Lynch et al. | |
| 5,437,719 A | | 8/1995 | Lynch et al. | |
| 5,480,480 A | * | 1/1996 | Lynch | C09D 5/29 106/181.1 |
| 8,317,911 B2 | * | 11/2012 | Bricout | C09D 7/001 106/14.22 |

* cited by examiner

*Primary Examiner* — Robert Harlan
(74) *Attorney, Agent, or Firm* — Charney IP Law LLC; Thomas M. Finetti (57) ABSTRACT

In one aspect of the present disclosure is a multicolor paint composition comprising a mixture of a resin composition, a colloid-forming composition, and at least one dispersed pigment composition.

20 Claims, 1 Drawing Sheet

LARGE PARTICLE SIZE MULTICOLOR PAINT

CROSS REFERENCE TO RELATED APPLICATIONS

The present disclosure claims prior to U.S. Provisional Patent Application No. 62/111,438 filed on Feb. 3, 2015, the disclosure of which is hereby incorporated by reference herein in its entirety.

BACKGROUND OF THE DISCLOSURE

Multicolor paints are used to coat surfaces where it is desirable for more that one color to appear in the coating. Generally, there is a prominent color with speckles, streaks, or blotches of one or more additional colors dispersed therein. In some embodiments, a multicolor paint is a composition which, when coated on a surface and dried, results in a coating that is characterized by dispersed discrete spots (or dots). Multicolor paints can be easily applied to irregular surfaces and can be utilized in exterior applications. In fact, multicolor paints offer significant advantages as coatings for rough surfaces. Multicolor paints are widely used by professional painters in commercial and industrial settings. For example, multicolor paints are currently being used on a significant scale in painting commercial and public buildings, stadiums, and arenas. Multicolor paints can additionally be employed in painting vehicles, equipment, bridges, signs, and other types of structures.

Water-in-water multicolor paints have been proposed (see, for example, Sellars et al. U.S. Pat. No. 3,950,283, Grasko U.S. Pat. No. 3,852,076 and Zola U.S. Pat. No. 4,376,654) and are of commercial interest particularly in view of the developing governmental interest in establishing regulations limiting the quantity of organic volatiles emitted into the environment by a paint during application and subsequent air drying. The states of California, New Jersey and New York, for example, have adopted regulations limiting paint emissions and many other states reportedly will be adopting similar regulations.

BRIEF SUMMARY OF THE DISCLOSURE

In one aspect of the present disclosure is a method of preparing a multicolor paint composition comprising (i) providing a resin composition comprising water, a thickener, a polymeric resin, and a plasticizer; (ii) providing a colloid-forming composition comprising water and a gelling agent; (iii) providing at least two dispersed pigment compositions, wherein each of the at least two dispersed pigment compositions comprise different pigments, (iv) mixing the resin composition, the at least two dispersed pigment compositions, and the colloid-forming composition to form a multicolor paint composition comprising dispersible pigment globules, wherein the multicolor paint composition comprises between about 45% to about 55% of the colloid-forming composition by total weight of the multicolor paint composition; between about 12% to about 20% of the resin forming composition by total weight of the multicolor paint composition; and between about 25% to about 40% of the at least two dispersed pigment compositions by total weight of the multicolor paint composition; and wherein a size of the dispersible pigment globules ranges from about 2.5 mm to about 20 mm.

In some embodiments, the at least two dispersed pigment compositions are each prepared by mixing between about 60% to about 75% of the colloid-forming composition with between about 25% to about 40% of one of a base color composition. In some embodiments, any of the resin composition, colloid-forming composition, and at least two dispersed pigment compositions further comprises one or more additives. In some embodiments, the additive is selected from the group consisting of preservatives, surfactants, stabilizers, and defoaming agents. In some embodiments, the resin is a carboxylated styrene acrylic polymer. In some embodiments, the resin is a provided as a colloidal dispersion. In some embodiments, the thickener comprises hydroxyethylcellulose. In some embodiments, the resin composition has a viscosity ranging from between about 15000 cps to about 25000 cps. In some embodiments, the colloid-forming composition has a viscosity ranging from between about 500 cps to about 850 cps.

In another aspect of the present disclosure is a method of preparing a multicolor paint composition comprising (i) providing a resin composition comprising (a) between about 40% to 50% of water by total weight of the resin composition; (b) between about 0.3% to about 1% of a thickener by total weight of the resin composition; (c) between about 40% to about 50% of a polymeric resin by total weight of the resin composition; (d) between about 2% and about 4% of a plasticizer by total weight of the resin composition; and (e) between about 0.3% to about 2% of one or more additives by total weight of the resin composition; (ii) providing a colloid-forming composition comprising (a) between about 80% to 95% of water by total weight of the colloid-forming composition; (b) between about 4% and about 15% of a gelling agent by total weight of the colloid-forming composition; (iii) providing at least two dispersed pigment compositions, the at least two dispersed pigment compositions each comprising (a) between about 72% to about 90% of water by total weight of the dispersed pigment composition; (b) between about 3% and about 8% of a gelling agent by total weight of the dispersed pigment composition; (c) between about 0.4% to about 7% of a first pigment by total weight of the dispersed pigment composition; (d) between about 4% to about 8% of an extending agent by total weight of the dispersed pigment composition; (e) between about 0.2% to about 0.5% of a thickener by total weight of the dispersed pigment composition; and (f) between about 0.5% to about 4% by weight of at least one additive by total weight of the dispersed pigment composition; wherein each of the dispersed pigment compositions comprise a different pigment; and mixing the resin composition, the at least two dispersed pigment compositions, and the colloid-forming composition to form a multicolor paint composition comprising dispersible pigment globules, wherein the multicolor paint composition comprises between about 45% to about 55% of the colloid-forming composition by total weight of the multicolor paint composition; between about 12% to about 20% of the resin forming composition by total weight of the multicolor paint composition; and between about 25% to about 40% of the at least two dispersed pigment compositions by total weight of the multicolor paint composition; and wherein a size of the dispersible pigment globules ranges from about 2.5 mm to about 20 mm.

In some embodiments, the at least two dispersed pigment compositions are each prepared by mixing between about 60% to about 75% of the colloid-forming composition with between about 25% to about 40% of one of a base color composition. In some embodiments, the base color composition comprises (a) between about 55% to about 80% of water by total weight of the base color composition; (b) between about 2% to about 20% of at least one pigment by total weight of the base color composition; (c) between about 18 to about 25% of an extending agent by total weight of the base color composition; (e) between about 0.5% to about 2% of a thickener by total weight of the base color composition; and (f) between about 1% to about 10% by weight of at least one additive by total weight of the base color composition. In some embodiments, the base color composition comprises at least two pigments. In some embodiments, the base color composition comprises at least three pigments. In some embodiments, the base color composition comprises four pigments.

In some embodiments, the additive is selected from the group consisting of preservatives, surfactants, stabilizers, and defoaming agents. In some embodiments, the resin is a carboxylated styrene acrylic polymer. In some embodiments, the resin is a provided as a colloidal dispersion. In some embodiments, the thickener comprises hydroxyethylcellulose. In some embodiments, the resin composition has a viscosity ranging from between about 15000 cps to about 25000 cps. In some embodiments, the colloid-forming composition has a viscosity ranging from between about 500 cps to about 850 cps.

In another aspect of the present disclosure is a coating produced by continuously applying a layer of the multicolor paint composition of the present disclosure, and then drying the layer. In some embodiments, the step of applying the layer comprises spraying the multicolor paint composition onto a substrate.

In another aspect of the present disclosure is a multicolor paint composition comprising a mixture of a resin composition, a colloid-forming composition, and at least one dispersed pigment composition, as each of those compositions are defined herein.

In another aspect of the present disclosure is a method of forming dispersed pigment globules comprising (a) providing a colloid-forming composition comprising water and a gelling agent; (b) providing a base color composition, the base color composition comprising water, at least one pigment, an extending agent, and a thickener; (c) mixing the colloid-forming composition and the base color composition; and (d) passing the mixture of the colloid-forming composition and the base color composition through a sieve, the sieve having a plurality of differently sized mesh openings. In some embodiments, the dispersed pigment globules have a size ranging from about 2.5 mm to about 20 mm. In some embodiments, a vacuum is used to pull the colloid-forming composition and the base color composition through the sieve. Without wishing to be bound by any particular theory, it is believed that this enables the skilled artisan to control the particle size uniformly based on the size of the openings in the last disc in the sieve, where sieves are aligned in an order of decreasing mesh size.

DETAILED DESCRIPTION

In one aspect of the present disclosure is a method of preparing a multicolor paint having large pigment globules (agglomerations or aggregations of pigment particles) that can be sprayed from a spray gun, e.g. a spray gun having an opening of about 3.5 mm. In contrast to prior art multicolor paints and coatings, which are believed to have small- or medium-sized pigment particles (e.g. sizes less than 2.5 mm), the present disclosure provides a coating having comparatively larger pigment globules. In some embodiments, the pigment is in the form of dispersible globules having ultimate particle sizes ranging from about 2.5 mm to about 20 mm. In some embodiments, a mean particle size ranges from about 2.5 mm to about 15 mm. In other embodiments, a mean particle size ranges from about 2.5 mm to about 10 mm. In yet other embodiments, a mean particle size ranges from about 2.5 mm to about 5 mm.

The disclosure further provides improved multicolored surface coatings produced from the application and drying of the multicolor paint composition. Also, the inventive multicolor paints are characterized by a sufficiently low content of volatile organic components to be acceptable under certain proposed and recently adopted governmental regulations concerning paints and coatings.

The multicolor paint compositions of this disclosure are believed to be characteristically indefinitely storage stable, including shelf, shipping, thermal, and vibrational (mixing) aspects. The excellent strength and stability characteristics of a multicolored paint composition of this disclosure provide a composition which can be brushed, rolled or sprayed where high shear forces are characteristically exerted upon the formulation being so applied, without significant breakdown of the dispersed pigment globules.

While a multicolor paint composition characteristically contains at least two distinct colors, those skilled in the art will appreciate that a particular multicolor paint formulation may contain many different classes of distinctly separately colored dispersed pigment globules. For example, the multicolor paint compositions may comprise two colors. In other embodiments, the multicolor paint compositions may comprise three colors. In yet other embodiments, the multicolor paint compositions may comprise four or more colors.

In general, the method of the present disclosure provides different compositions which are ultimately mixed and blended to form the multicolor paint composition having the above-identified particle sizes. In some embodiments, the method comprising mixing together (1) a resin composition; (2) a colloid-forming composition; and (3) at least two different dispersed pigment compositions, wherein each dispersed pigment composition comprises a different pigment. Each of these compositions are described in more detail herein.

Resin Composition

In general, the resin compositions of the present disclosure comprise water (deionized), a thickener, a polymeric resin, and a plasticizer. In some embodiments, the resin compositions further comprise one or more additives.

In some embodiments, the thickener is selected from water-soluble polyalkylene oxides and hydroxylated or carboxylated cellulose-derived polymers, including, but not limited to salts of cellulosic acids and carboxyalkyl-derivatives of cellulose, such as carboxyethylcellulose, carboxymethylcellulose, and carboxyhydroxycellulose. In other embodiments, the thickener is a hydroxy (lower alkyl) cellulose. As used herein, the term "lower alkyl" generally refers to an alkyl moiety containing from (and including) one through four carbon atoms. In some embodiments, the cellulosic polymer is hydroxyethylcellulose (e.g. sold as Natrosol 250 HR). In some embodiments, an amount of the thickener within the resin composition ranges from about 0.3% to about 1% by total weight of the resin composition.

In some embodiments, the polymeric resin is a carboxylated polymer or copolymer. In some embodiments, the polymeric resin is a carboxylated styrene acrylate copolymer. In some embodiments, the carboxylated styrene acrylate copolymer comprises about 50 to about 75 weight percent styrene and correspondingly about 25 to 50 weight percent of at least one (lower alkyl) acrylate monomer on a 100 weight percent total carboxylated polymer basis. Examples include carboxylated styrene acrylate copolymers available from Omnova Solutions under the trademark Pliotec with associated product designation numbers 7103 and 7104 which are believed to be particularly suitable. These copolymers apparently contain, on a 100 weight percent total polymer weight basis, about 65 weight percent styrene and about 35 weight percent n-butyl acetate, and are carboxylated to an extent sufficient to contain about 3 to about 4 weight percent carboxyl groups per molecule.

Other suitable carboxylated polymers suitable for use as a resin include those having a polymer containing from about 15 to about 50 weight percent of at least one polymerized acrylic monomer with the balance up to 100 weight percent being at least one vinyl group containing monomer on a total polymer weight basis.

In some embodiments, the resin is an acrylate dispersion, such as ALBERDINGK AC-2523, available from Alberdingk Boley GmbH. In other embodiments, an acrylic resin or acrylic polymer dispersion may be utilized, such as those available from BASF (e.g. Acronal 7077 or Acronal 7079).

In some embodiments, the resin selected is a combination of one of the "resins" enumerated herein. The skilled artisan will appreciate that other resins may qualify, provided that they are water-based emulsions or dispersions, and further provided that they do not affect stability of the final multicolor paint compositions.

In some embodiments, an amount of the polymeric resin within the resin composition ranges from about 35% to about 55% by total weight of the resin composition. In other embodiments, the polymeric resin ranges from about 40% to about 50% by total weight of the resin composition.

In some embodiments, the plasticizer is selected from adipic acid esters, azelaic acid esters, citric acid esters, acetylcitric acid esters, myristic acid esters, phosphoric acid esters, ricinoleic acid esters, acetylricinoleic acid esters, sebacic acid esters, stearic acid esters, epoxidized esters, as well as 1,4-butane diol dicaprylate, butoxyethyl pelargonate di[(butoxyethoxy)ethoxy] methane, dibutyl tartrate, diethylene glycol dipelargonate, diisooctyl diglycolate, isodecyl nonanoate, tetraethylene glycol di(2-ethylbutyrate), triethylene glycol di(2-ethyl-hexanoate), triethylene glycol dipelargonate and 2,2,4-trimethyl-1,3-pentane diol diisobutyrate. Additional various plasticizers, cyclic, acyclic, and otherwise, include chlorinated paraffins, hydrogenated terphenyls, substituted phenols, propylene glycols, polypropylene glycol esters, polyethylene glycol esters, melamines, epoxidized soys, oils, melamines, liquid, hydrogenated abietate esters, epoxytallate esters, alkyl phthalyl alkyl glycolates, sulfonamides, sebacate esters, aromatic epoxies, aliphatic epoxies, liquid poly(<3>-methyl styrene), maleate esters, mellitate esters, benzoates, benzyl esters, tartrates, succinates, isophthalates, orthophthalates, butyrates, fumarates, glutarates, dicaprylates, dibenzoates and dibenzyl esters. Examples of suitable plasticizers include monomeric plasticizers, such as phthalates like dibutyl phthalate, diisodecyl phthalate, dioctyl phthalate, tricresyl phosphate, butyl benzyl phthalate, and the like. Other suitable monomeric plasticizers can be selected from among the adipates, sebacates, glycolates, castor oils, and the like. An example of one specific plasticizer is texanol isobutyrate.

In some embodiments, an amount of the plasticizer within the resin composition ranges from between about 1% to about 5% by total weight of the resin composition. In other embodiments, the amount plasticizer ranges from between about 21% to about 4% by total weight of the resin composition.

In some embodiments, the resin composition comprises one or more additives. In some embodiments, the resin composition comprises at least one of an defoaming agent and/or a preservative. In some embodiments, an amount of the defoaming agent within the resin composition ranges from between about 0.1% to about 1% by total weight of the resin composition Suitable defoaming agents include, but are not necessarily limited to, sulfonated oils, organic phosphates, silicone fluids, dimethylpolysiloxanes, and the like. Examples of defoaming agents include the material available commercially from Henkel under the trademarks "Foamaster VL", "Dehydran 1293", "Nopco NXZ", and the like. Another defomaing agent is Rhodoline 643, available from Solvay Novecare. Yet other defoaming agents include Dow Corning Anti-foam Agent DB-31, SG-10, 1510US, 544 compound, DB110A, and defoaming agents, all of which are commercially available from Dow Corning.

Examples of suitable preservatives include anti-microbial agents, anti-fungal agents, and anti-mildew agents. In some embodiments, the preservatives are selected from Nuosept 95 (Cosan Chemical Co., Carlstadt, N.J.), Fungitrol 234 (Huls America, Inc., Piscataway, N.J.), and Dowicil 75 (available from Dow Chemical). In some embodiments, an amount of the preservative within the resin composition ranges from between about 0.1% to about 1% by total weight of the resin composition.

Colloid-Forming Composition

In some embodiments, the colloid-forming composition comprises deionized water and a gelling agent. The term "gelling agent" as used here and hereafter refers to a compound capable of increasing the viscosity of a water-based composition, or capable of converting a water-based composition to a gel or semisolid. The gelling agent, therefore, can be organic in nature, for example, a natural gum or a synthetic polymer, or can be inorganic in nature. In some embodiments, the colloid-forming composition comprises between about 4% to about 20% of a gelling agent by total weight of the colloid-forming composition. In other embodiments, the colloid-forming composition comprises between about 4% to about 15% of a gelling agent by total weight of the colloid-forming composition.

The following are non-limiting examples of gelling agents are useful in preparing the colloid-forming compositions of the present disclosure and include acacia, acrylates/steareth-20 methacrylate copolymer, agar, algin, alginic acid, ammonium acrylate copolymers, ammonium alginate, ammonium chloride, ammonium sulfate, amylopectin, attapulgite, bentonite, C9-15 alcohols, calcium acetate, calcium alginate, calcium carrageenan, calcium chloride, caprylic alcohol, vinyl polymers such as cross linked acrylic acid polymers with the CTFA name Carbomer such as but not limited to carbomer 910, carbomer 934, carbomer 934P, carbomer 940, carbomer 941, carboxymethyl hydroxypropyl guar, carrageenan, cellulose gum, cetearyl alcohol, cetyl alcohol, corn starch, damar, dextrin, dibenzylidine sorbitol, ethylene dihydrogenated tallowamide, ethylene dioleamide, ethylene distearamide, gelatin, guar gum, is guar hydroxypropyltrimonium chloride, hectorite, hyaluronic acid, hydrated silica, hydroxyethyl stearamide-MIPA, hydroxypropyl guar, isocetyl alcohol, isostearyl alcohol, karaya gum, kelp, lauryl alcohol, locust bean gum, magnesium aluminum silicate, magnesium silicate, magnesium trisilicate, methoxy PEG-22/dodecyl glycol copolymer, methylcellulose, microcrystalline cellulose, montmorillonite, myristyl alcohol, oat flour, oleyl alcohol, palm kernel alcohol, pectin, PEG-2M is also known as Polyox WSR® N-10, which is available from Union Carbide and as PEG-2,000; PEG-5M is also known as Polyox WSR® N-35 and Polyox WSR® N-80, both available from Union Carbide and as PEG-5,000 and Polyethylene Glycol 300,000; PEG-7M is also known as Polyox WSR® N-750 available from Union Carbide; PEG 9-M is also known as Polyox WSR® N-3333 available from Union Carbide; PEG-14M is also known as Polyox WSR® N-3000 available from Union Carbide., polyacrylic acid, polyvinyl alcohol, potassium alginate, potassium aluminum polyacrylate, potassium carrageenan, potassium chloride, potassium sulfate, potato starch, propylene glycol alginate, sodium acrylate/vinyl alcohol copolymer, sodium carboxymethyl dextran, sodium carrageenan, sodium cellulose sulfate, sodium chloride, sodium polymethacrylate, sodium silicoaluminate, sodium sulfate, stearalkonium bentonite, stearalkonium hectorite, stearyl alcohol, tallow alcohol, TEA-hydrochloride, tragacanth gum, tridecyl alcohol, tromethamine magnesium aluminum silicate, wheat flour, wheat starch, xanthan gum, and mixtures thereof.

In some embodiments, the gelling agent is a clay, e.g. a natural clay or a synthetic clay. In some embodiments, the gelling agent is a mixture of two or more clays. Examples of clays include synthetic silicate clays resembling hectorite and/or saponite, montmorillonite, beidellite, nontronite, sauconite, stevensite, smectite and other inorganic minerals which are characterized by a tendency to swell by absorbing water between adjacent crystal layers, and to split into fragments capable of forming colloidal dispersions. In some embodiments, the silicate clay is a synthetic sodium magnesium lithium silicate hectorite-type clay. This material is obtainable commercially from Waverly Mineral Products of Balacynwyd, Penna. which is a subsidiary of La Porte Inc. of the United Kingdom under the trademark designation "Laponite" RD or RDS. Other suitable hectorite clays are available commercially from the R. T. Vanderfilt Company under the trademark "Veegum T", or from the Baroid Div., National Lead Company under the trademark "Macaloid". The above described clays are employed in the practice of this disclosure in combination with a water soluble peptizing agent. Such an agent induces the clay to form a stable colloidal aqueous dispersion.

In some embodiments, the gelling agent is LAPONITE-S 482, which is a highly shear thinning layered silicate rheological additive for water-borne systems. It is generally used in highly filled surface coatings and general applications. Synergistic benefits when used in combinations with polymer based co-thickeners. Laponite is believed to form low viscosity pre-mixes in water, which thicken on addition to formulations. Laponite is available from Altana.

In some embodiments, the gelling agent comprises a mixture of hectorite clay and a bentonite clay. In some embodiments, a ratio of an amount of hectorite clay to bentonite clay ranges from about 10:1 to about 1:10.

Dispersed Pigment Compositions

In preparing the multicolor paint compositions of the present disclosure, a base color composition (comprising color pigment particles) is mixed with the colloid-forming composition to provide a dispersed pigment composition. The skilled artisan will appreciate that multiple different dispersed pigment compositions may be prepared, where each dispersed pigment composition may have (i) a different color; and/or (2) a different dispersed pigment globule size (or distribution of sizes). In this way, multiple dispersed pigment compositions may be mixed or blended together to achieve a desired multicolor paint composition having dispersed globules of different colors and/or different sizes.

In some embodiments, each of the dispersed particle compositions are prepared separately by combining at least one base color composition with the colloid-forming composition described herein. The process of combining the base color composition with the colloid-forming composition allows dispersed pigment globules to be formed where the pigment globules are agglomerations or aggregations of pigment particles from the base color compositions.

In some embodiments, dispersed pigment compositions are prepared by directly adding one or more base color compositions (e.g. comprising different pigments) to the colloid-forming composition and stirring after the addition to produce the desired discrete pigment globules (e.g. those having a certain size or size distribution). In some embodiments, pigment globule size may be controlled by controlling the rate of stirring or mixing.

In other embodiments, the dispersed pigment compositions are prepared by mixing together one or more base color compositions with the colloid-forming composition, where the mixture is poured through a sieve, the sieve having differently sized openings such that a dispersion of pigment globules is formed, the dispersion having a certain size distribution. In some embodiments, the particle/globule size distribution ranges from about 2 mm to about 20 mm.

In some embodiments, the dispersed pigment compositions comprise between about 60% to about 80% of the colloid-forming composition by total weight of the dispersed pigment composition. In other embodiments, the dispersed pigment compositions comprise between about 65% to about 75% of the colloid-forming composition by total weight of the dispersed pigment composition. The remainder of any dispersed pigment composition is comprised of a base color composition (described further herein).

In some embodiments, the dispersed pigment compositions comprise deionized water; a gelling agent; a pigment; an extending agent; a thickener; and optionally one or more additives. In other embodiments, the dispersed pigment compositions comprise (a) between about 72% to about 90% of water by total weight of the dispersed pigment composition; (b) between about 3 and about 8% of a gelling agent by total weight of the dispersed pigment composition; (c) between about 0.4% to about 7% of a pigment by total weight of the dispersed pigment composition; (d) between about 4 to about 8% of an extending agent by total weight of the dispersed pigment composition; (e) between about 0.2% to about 0.5% of a thickener by total weight of the dispersed pigment composition; and (f) between about 0.5 to about 4% by weight of at least one additive by total weight of the dispersed pigment composition.

Base Color Compositions

In some embodiments, the base color compositions comprise water; a pigment; an extending agent; a thickener; and optionally one or more additives. Black, white, yellow, and red base color compositions are exampled at Examples 1 through 4. In some embodiments, any of the base color compositions may be mixed, in appropriate proportions, to provide a base color composition having a different color. Example 5 illustrates a composition where white, black, yellow, and red base compositions were mixed to provide a cream colored base composition.

Any pigment known to those of ordinary skill in the art may be utilized as a pigment. Examples of pigments include titanium dioxide, iron oxide, lamp black, carbon black, zinc oxide, chromium oxide, zinc chromate, strontium chromate, barium chromate, chromium oxide, zinc sulfide, yellow nickel titanium, yellow chromium titanium, red iron oxide, transparent red iron oxide, yellow iron oxides, transparent yellow oxide, black iron oxide, naphthol reds and browns, anthraquinones, dioxazine violet, isoindoline yellows, arylide yellow and oranges, ultramarine blue, phthalocyanine complexes, amaranth, quinacridones, halogenated thioindigo pigments, phthalocyanine blue; phthalocyanine green; various organic and inorganic yellow pigments, such as, for example, D & C yellows including quinoline yellow, yellow iron oxide, and the like; various organic and inorganic red pigments, such as, for example, D & C reds including quinacridone red and red iron oxide, respectively, etc.

Titanium dioxide pigments (white pigments) such as TiONA® 595 are available from Cristal. Other titanium dioxide pigments are available from Huntsman and DuPont. Raven 14 PWD (black pigments) are available from Birla Carbon. Red iron oxide, e.g. red oxide S157M, is available from Yipin Pigments. Yellow iron oxide, e.g. Yellow Bayferrox® 3920, is able for Lanxess.

In some embodiments, the base color composition comprises between about 2% to about 20% of at least one pigment by total weight of the base color composition.

In some embodiments, the base color compositions comprise an extending agent. In some embodiments, the extending agent is magnesium silicate, aluminum silicate, calcium silicate, calcium carbonate, fumed silica, barium sulfate. In other embodiments, the extending agent is calcium carbonate. In some embodiments, the base color composition comprises between about 18 to about 25% of an extending agent by total weight of the base color composition. Without wishing to be bound by any particular theory, it is believed that the extending agent provides inherent structure to the multicolor paint to reduce shrinkage and peeling, and to leave a continuous coating after the moisture evaporates.

In some embodiments, the base color composition comprises a thickener, such as those described previously herein. In some embodiments, the base color composition comprises between about 0.5% to about 2% of a thickener by total weight of the base color composition.

In some embodiments, the base composition comprises one or more additives and any additive may be present in an amount ranging from between about 1 to about 10% by weight of at least one additive by total weight of the base color composition. In some embodiments, the base color composition at least one of an defoaming agent, a preservative, and/or a surfactant. Other additives suitable for use in the base color compositions include fillers and stabilizers (e.g. Tamol 731, available from Dow Chemical).

Ionic and/or non-ionic surfactants may be used to reduce the surface tension and to increase the efficiency of the multicolor paint in wetting its ingredients during blending. Suitable surfactants for use with any of these solvent systems include, but are not necessarily limited to, sodium alkyl and aryl sulfonates (anionic), alkyl phenol ethers of polyethylene glycol (non-ionic), and various cationic agents. In some embodiments, the surfactants are Dupanol ME, available from Dupont, Tergitol™ and Tergitol 15S70, both of which are available from Union Carbide; Triton X-100, available from Rohm & Haas; and Trion CF available from Dow Chemical.

Mixing

The resin composition, colloid-forming composition and the at least two dispersed pigment compositions are blended together using simple mechanical blending procedures and conventional mixing apparatus with the amount of mixing shear force used being at least sufficient to produce a uniform and homogeneous product blend. In some embodiments, and as noted herein, mixing is performed at a slow speed to provide for larger particle sizes. In some embodiments, the mixing is conducted using a propeller type blade. In some embodiments, mixing is conducted with low shear to prevent particles from breaking down in a high shear environment.

In other embodiments, again as noted herein, the compositions are passed through a sieve, the sieve having a plurality of different mesh size openings. When a composition comprising pigments and colloid-forming components is passed through the size, a distribution of differently sized pigment globules is formed. In some embodiments, the distribution provides "large" pigment globules (as compared with the prior art), and the pigment globules within the distribution range in size from about 2.5 mm to about 20 mm. In some embodiments, the sieve provides for uniform particle size without dependence on shearing from a mixing blade.

Figure 1:
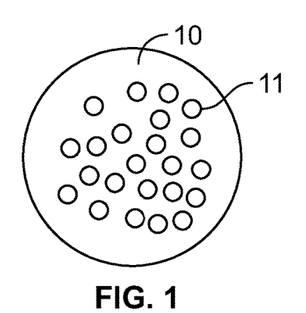
FIG. 1 illustrates a disc having a plurality of openings.
Figure 2:
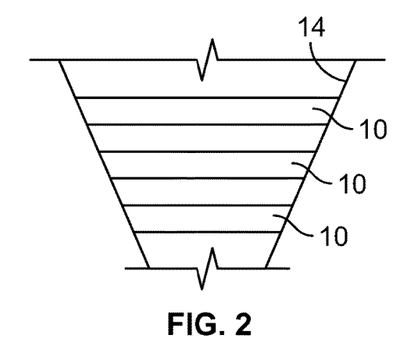
FIG. 2 illustrates one embodiment of a sieve having a plurality of openings.
Figure 3:
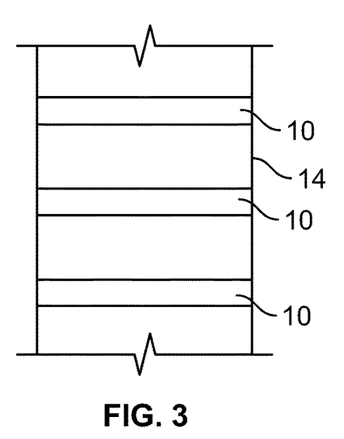
FIG. 3 illustrates another embodiment of a sieve having a plurality of openings.

In some embodiments, the sieve 14 (see, for example FIGS. 2 and 3) comprises a plurality of stacked discs 10, each disc comprising a plurality of openings 11 (see FIG. 1), wherein a mesh size of the plurality of openings in each of the stacked discs is different or wherein the arrangement of openings in each of the stacked discs is different. In some embodiments, the sieve 14 comprises three stacked discs 10, where each disc comprises a plurality of openings 11, and where the plurality of openings 11 are different for each of the stacked discs 10. In some embodiments, a bottom stacked disc 10 within any sieve 14 comprises a plurality of openings 11 having a mesh size which ultimately enables the generation of pigment globules having the desired size (i.e. the mesh size of the bottom stacked disc best approximates the particle size distribution of the desired particle globules); and where stacked discs 10 arranged above the bottom stacked disc comprise a plurality of openings 11 which are larger than the plurality of openings in the bottom stacked disc. In some embodiments, the plurality of openings 11 may have a mesh size selected form the group consisting of 2, 3, 4, 5, 8, 14, 20, and 30. In some embodiments, a diameter of the plurality of openings is selected from the group consisting of 6.7 mm, 4.75 mm, 4 mm, 2.36 mm, 1.4 mm, 0.85 mm, and 0.6 mm. In some embodiments, a diameter of the plurality of openings ranges from between 8 mm to about 0.8 mm. In yet other embodiments, a diameter of the plurality of openings ranges from between about 9.51 mm to about 0.595 mm.

Figure 4:
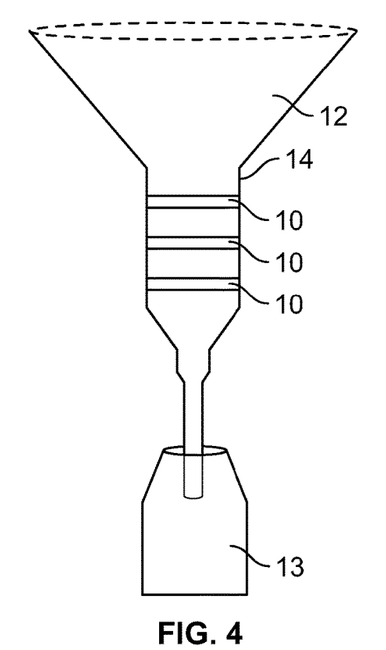
FIG. 4 illustrates an apparatus for mixing components of a multicolor paint composition, the apparatus comprising a plurality of discs, each disc having a plurality of openings.

In some embodiments, the sieve is configured such that a vacuum is applied to the material poured through the sieve 14. This is believed to assist in generating the pigment globules of the desired size. Without wishing to be bound by any particular theory, it is believed that this enables the skilled artisan to control the particle size uniformly based on the size of the openings in the last disc in the sieve, where sieves are aligned in an order of decreasing mesh FIG. 4 illustrates an apparatus comprising a funnel 12 connected to the sieve 14, where in the sieve 14 is in communication with and a collection flash 13 for mixing components of a multicolor paint composition, the sieve 14 comprising a plurality of discs 10, each disc 10 having a plurality of openings 11. In some embodiments, the dispersed pigment globules have a size ranging from about 2.5 mm to about 20 mm.

In some embodiments, more than one color globule can be in the mix in the funnel/sieve and all globules will come out as discrete colors that do not merge with one another. Indeed, any colloid-forming composition and any number of base color compositions (or mixtures thereof) may be combined in accordance with this process. In some embodiments, the discrete globules may all have about the same size (or size distribution) due to the final disc in the sieve (having a certain size openings).

Coating Film Forming Method

As with most any painting project, the surface being treated should be free of dirt, oils, debris, and other contaminants. The area should be substantially free of residual dust, particulates, or other construction debris floating in the air as they may adhere to the paint and create unwanted particles that would be detrimental to the suitability of the resultant dry erase writing surface. In some embodiments, a primer may be applied prior to applying the coating compositions of the present disclosure. In some embodiments, the multicolor paint composition can be applied using conventional spray equipment or high volume low pressure spray equipment resulting in a high quality finish. In some embodiments, the coating can have a thickness between about 0.001 inch and about 0.125 inch, e.g., between about 0.002 inch and about 0.1 inch, or between about 0.004 inch and about 0.08 inch, or between about 0.006 inch and about 0.06 inch, or between about 0.008 inch and about 0.04 inch, or between about 0.01 inch and about 0.02 inch. In other embodiments, the coating can have a thickness of greater than 0.005 inch, e.g., greater than 0.0075 inch or greater than 0.010 inch.

The multicolored paint compositions of the present disclosure may be applied to surfaces as follows. For example, standard procedures normal to the painting profession for using conventional paint products should be followed. A suitable undercoat or primer should be used prior to application, depending on the surface. For example, a primer such as Vitricoat Primer (Vitricon, Inc., Hauppauge, N.Y.) should be used on exterior masonry surfaces and over pre-existing coatings. Bare metal must be primed with a rust-inhibiting primer, such as with Polyseal ZC Primer. Bare wood must be primed with an oil-type wood primer or enamel undercoater. On drywall, a primer, such as Vitricoat Primer, may be used to eliminate telegraphing of joints. On masonry block walls, a primer such as Vitricolor Primer should be used to fill pores and voids.

Exterior chalking surfaces should be sandblasted prior to application. All interior glossy surfaces should be cleaned with a detergent to remove dirt, grease, and debris. The coating should not be applied to damp surfaces.

The coating of the present disclosure can be sprayed, for example, with a Binks 2001 paint sprayer with a cup at incoming pressure of 15-100 psi, pot pressures of 3-5 psi. The tip at the nozzle of the sprayer can be a 66 SD type, or one such as a 200 tip from Binks (Franklin Park, Ill.). Water should always be run through the spray equipment to be used prior to the application of the sprayable multicolored coating. The coating should be stirred slowly prior to application, and the coating container should be shaken gently periodically during application to facilitate spraying.

In some embodiments, the multicolor paint composition is applied to a substrate including, but is not limited to, porous (e.g., paper) and non-porous substrates (e.g., densified ceramics). The substrate could be a flexible film or a rigid movable or immovable structure. Examples of the substrate include, but are not limited to, a polymeric material (such as polyester or polyamide), cellulosic material (such as paper), glass, wood, plaster (painted or unpainted), melamine, fiber board, particle board, gypsum board, densified ceramics, stone (such as granite), concrete, brick, composites, and metal (such as aluminum or stainless steel). The substrate could be a newly built structure or even an old and worn out chalkboard, blackboard, or whiteboard. In some instances, the surface of the substrate can be cleaned by sanding the surface and priming the surface prior to application of the coating. In some instances, the surface can also be cleaned with a cleaning agent (e.g., a mild acid) in order to provide better adhesion of the coating to the surface or sanded with 150 grit paper.

In other embodiments, suitable substrates to which the coating may be applied include, for example, metal, wood, plastic, including plastic in the form of films, especially ABS, AMMA, ASA, CA, CAB, EP, UF, CF, MF, MPF, PF, PAN, PA, PE, HDPE, LDPE, LLDPE, UHMWPE, PET, PMMA, PP, PS, SB, FUR, PVC, RF, SAN, PBT, PPE, POM, PUR-RIM, SMC, BMC, PP-EPDM, and UP (abbreviations according to DIN 7728T1), paper, leather, textiles, felt, glass, wood, wood materials, cork, inorganically bonded substrates such as wooden boards and fiber cement/concrete/brick slabs, electronic assemblies or mineral substrates. It is also possible to coat substrates consisting of a variety of the above-mentioned materials, or to coat already coated substrates such as floors, countertops, vehicles, aircraft or boats and also parts thereof, especially vehicle bodies or parts for exterior mounting.

| Example 1: Black Base Color Composition | |
|---|---|
| Component | Amount (pounds) |
| Deionized Water | 73.46 |
| Natrosol 250HR | 1.06 |
| Dowicil 75 | 0.03 |
| Raven 14 PWD | 2.67 |
| Tamol 731 | 0.71 |
| Triton CF | 0.24 |
| Rhodaline 643 | 0.42 |
| Limestone (ground) | 21.42 |

To produce the black base composition, in general, the deionized water, Natrosol 250HR, and Dowicil 75 are first mixed together. Raven 14 PWD, Tamol 731, Triton CF, and Rhodaline 643 are then added to the resulting mixture. Next, the ground limestone and additional Rhodaline 643 are added (a second aliquot of 0.21 pounds) and mixed at high speed using a cowles blade. The black base color composition comprises a solids content of about 39.05% by total weight of the black base color composition.

| Example 2: White Base Color Composition | |
|---|---|
| Component | Amount (pounds) |
| Deionized Water | 60.39 |
| Natrosol 250HR | 1.09 |
| Dowicil 75 | 0.03 |
| Tiona 595 Rutile | 15.1 |
| Tamol 731 | 0.73 |

-continued

| Example 2: White Base Color Composition | |
|---|---|
| Component | Amount (pounds) |
| Triton CF | 0.25 |
| Rhodaline 643 | 0.42 |
| Limestone (ground) | 22.01 |

To produce the white base composition, in general, the deionized water, Natrosol 250HR, and Dowicil 75 are first mixed together. Tiona 595 Rutile, Tamol 731, Triton CF, and Rhodaline 643 are then added to the resulting mixture. Next, the ground limestone and additional Rhoadline 643 are added (a second aliquot of 0.21 pounds) and mixed at high speed using a cowls blade. The white base color composition comprises a solids content of about 36.75% by total weight of the white base color composition.

| Example 3: Red Base Color Composition | |
|---|---|
| Comionent | Amount (pounds) |
| Deionized Water | 64.23 |
| Natrosol 250HR | 1.16 |
| Dowicil 75 | 0.03 |
| Red oxide Yipin S157M | 9.69 |
| Tamol 731 | 0.77 |
| Triton CF | 0.26 |
| Rhodaline 643 | 0.44 |
| Limestone (ground) | 23.41 |

To produce the red base composition, in general, the deionized water, Natrosol 250HR, and Dowicil 75 are first mixed together. Red oxide Yipin S157M, Tamol 731, Triton CF, and Rhodaline 643 are then added to the resulting mixture. Next, the ground limestone and additional Rhoadline 643 are added (a second aliquot of 0.21 pounds) and mixed at high speed using a cowls blade. The cream base color composition comprises a solids content of about 35.17% by total weight of the red base color composition.

| Example 4: Yellow Base Color Composition | |
|---|---|
| Component | Amount (pounds) |
| Deionized Water | 63.16 |
| Natrosol 250HR | 1.14 |
| Dowicil 75 | 0.03 |
| Yellow Bayferrox 3920 | 11.19 |
| Tamol 731 | 0.76 |
| Triton CF | 0.25 |
| Rhodaline 643 | 0.44 |
| Limestone (ground) | 23.02 |

To produce the yellow base composition, in general, the deionized water, Natrosol 250HR, and Dowicil 75 are first mixed together. Yellow Bayferrox 3920, Tamol 731, Triton CF, and Rhodaline 643 are then added to the resulting mixture. Next, the ground limestone and additional Rhoadline 643 are added (a second aliquot of 0.21 pounds) and mixed at high speed using a cowls blade. The yellow base color composition comprises a solids content of about 36.24% by total weight of the yellow base color composition.

| Example 5: Cream Base Color Composition | |
|---|---|
| Component | Amount (pounds) |
| White Base Color Composition (e.g. Example 2) | 44.74 |
| Yellow Base Color Composition (e.g. Example 4) | 138.79 |
| Red Base Color Composition (e.g. Example 3) | 10.32 |
| Black Base Color Composition (e.g. Example 1) | 6.16 |

As noted in this example, a cream base color composition may be developed by combining various base color compositions having different colored pigments in appropriate proportions. Of course, any color may be generated in this manner and is well within the technique of those of ordinary skill in the art. The cream base color composition comprises a solids content of about 36.75% by total weight of the colloid-forming composition.

| Example 6: Colloid-Forming Composition | |
|---|---|
| Component | Amount (pounds) |
| Deionized Water | 90.36 |
| Laponite S482 | 8.03 |
| Bentonite | 1.61 |

The colloid-forming composition comprises a solids content of about 9.64% by total weight of the colloid-forming composition.

| Example 7: Black Dispersed Pigment Composition | |
|---|---|
| Component | Amount (pounds) |
| Black Base Color Composition (e.g. Example 1) | 30.21 |
| Colloid-Forming Composition (e.g. Example 6) | 69.79 |

In some embodiments, the black dispersed pigment composition is prepared such that pigment globules having a size ranging from 2 mm to about 10 mm are produced. In some embodiments, the black dispersed pigment composition comprises a solids content of about 14.58% by total weight of the black dispersed pigment composition.

| Example 8: White Dispersed Pigment Composition | |
|---|---|
| Component | Amount (pounds) |
| White Base Color Composition (e.g. Example 2) | 30.21 |
| Colloid-Forming Composition (e.g. Example 6) | 69.79 |

In some embodiments, the white dispersed pigment composition is prepared such that pigment globules having a size ranging from 2 mm to about 10 mm are produced. In some embodiments, the white dispersed pigment composition comprises a solids content of about 18.52% by total weight of the white dispersed pigment composition.

Example 9: Cream Dispersed Pigment Composition

| Component | Amount (pounds) |
|---|---|
| Cream Base Color Composition (e.g. Example 5) | 30.47 |
| Colloid-Forming Composition (e.g. Example 6) | 69.53 |

In some embodiments, the cream dispersed pigment composition is prepared such that pigment globules having a size ranging from 5 mm to about 20 mm are produced. In some embodiments, the cream dispersed pigment composition comprises a solids content of about 17.90% by total weight of the cream dispersed pigment composition.

Example 10: Resin Composition

| Component | Amount (pounds) |
|---|---|
| Water (deionized) | 47.44 |
| Natrosol 250HR | 0.68 |
| Dowicil 75 | 0.38 |
| Pliotec 7104 | 47.44 |
| Rhodoline 643 | 0.29 |
| Texanol Isobutyrate | 3.76 |

To produce the resin composition, in general, the deionized water, Natrosol 250HR, and Dowicil 75 are first mixed together (such as until all components are dissolved). Pliotec 7104, Rhodoline 643, and texanol isobutyrate are then added to the resulting mixture. The resin composition comprises a solids content of about 26.46% by total weight of the resin composition. In some embodiments, the resin composition has a viscosity of about 20,000 cps.

Example 11: Multicolor Paint Composition

| Component | Amount (pounds) |
|---|---|
| Colloid-Forming Composition | 463.77 |
| Cream Dispersed Pigment Composition (e.g. Example 9) | 157.51 |
| White Dispersed Pigment Composition (e.g. Example 8) | 81.67 |
| Black Dispersed Pigment Composition (e.g. Example 7) | 40.83 |
| Resin Composition (e.g. Example 10) | 145.84 |

Each of the colloid-forming, cream dispersed pigment, white dispersed pigment, and resin compositions are slowly mixed together to form the a multicolor paint composition.

Although the disclosure herein has been described with reference to particular embodiments, it is to be understood that these embodiments are merely illustrative of the principles and applications of the present disclosure. It is therefore understood that numerous modifications may be made to the illustrative embodiments and that other arrangements may be devised without departing from the spirit and scope of the present disclosure as defined by the appended claims.

The invention claimed is:

1. A method of preparing a multicolor paint composition comprising
   (i) providing a resin composition comprising water, a thickener, a polymeric resin, and a plasticizer;
   (ii) providing a colloid-forming composition comprising water and a gelling agent;
   (iii) providing at least two dispersed pigment compositions, wherein each of the at least two dispersed pigment compositions comprise different pigments,
   (iv) mixing the resin composition, the at least two dispersed pigment compositions, and the colloid-forming composition to form a multicolor paint composition comprising dispersible pigment globules, wherein the multicolor paint composition comprises between about 45% to about 55% of the colloid-forming composition by total weight of the multicolor paint composition; between about 12% to about 20% of the resin forming composition by total weight of the multicolor paint composition; and between about 25% to about 40% of the at least two dispersed pigment compositions by total weight of the multicolor paint composition; and wherein a size of the dispersible pigment globules ranges from about 2.5 mm to about 20 mm.

2. A method of preparing a multicolor paint composition comprising
   (i) providing a resin composition comprising (a) between about 40% to 50% of water by total weight of the resin composition; (b) between about 0.3% to about 1% of a thickener by total weight of the resin composition; (c) between about 40% to about 50% of a polymeric resin by total weight of the resin composition; (d) between about 2% and about 4% of a plasticizer by total weight of the resin composition; and (e) between about 0.3% to about 2% of one or more additives by total weight of the resin composition;
   (ii) providing a colloid-forming composition comprising (a) between about 80% to 95% of water by total weight of the colloid-forming composition; (b) between about 4% and about 15% of a gelling agent by total weight of the colloid-forming composition;
   (iii) providing at least two dispersed pigment compositions, the at least two dispersed pigment compositions each comprising different pigments, wherein
      a. a first dispersed pigment composition comprises (a) between about 72% to about 90% of water by total weight of the first dispersed pigment composition; (b) between about 3% and about 8% of a gelling agent by total weight of the first dispersed pigment composition; (c) between about 0.4% to about 7% of a first pigment by total weight of the first dispersed pigment composition; (d) between about 4% to about 8% of an extending agent by total weight of the first dispersed pigment composition; (e) between about 0.2% to about 0.5% of a thickener by total weight of the first dispersed pigment composition; and (f) between about 0.5% to about 4% by weight of at least one additive by total weight of the first dispersed pigment composition;
      b. wherein a second dispersed pigment composition comprises (a) between about 72% to about 90% of water by total weight of the second dispersed pigment composition; (b) between about 3% and about 8% of a colloid-forming agent by total weight of the second dispersed pigment composition; (c) between about 0.4% to about 7% of a second pigment by total weight of the second dispersed pigment composition; (d) between about 4% to about 8% of an extending agent by total weight of the second dispersed pigment composition; (e) between about 0.2% to about 0.5% of a thickener by total weight of the second dispersed pigment composition; and (f)

between about 0.5% to about 4% by weight of at least one additive by total weight of the second dispersed pigment composition;

mixing the resin composition, the at least two dispersed pigment compositions, and the colloid-forming composition to form a multicolor paint composition comprising dispersible pigment globules, wherein the multicolor paint composition comprises between about 45% to about 55% of the colloid-forming composition by total weight of the multicolor paint composition; between about 12% to about 20% of the resin forming composition by total weight of the multicolor paint composition; and between about 25% to about 40% of the at least two dispersed pigment compositions by total weight of the multicolor paint composition; and wherein a size of the dispersible pigment globules ranges from about 2.5 mm to about 20 mm.

3. The method of claim 2, wherein the at least two dispersed pigment compositions are each prepared by mixing between about 60% to about 75% of the colloid-forming composition with between about 25% to about 40% of one of a base color composition.

4. The method of claim 3, wherein the base color composition comprises (a) between about 55% to about 80% of water by total weight of the base color composition; (b) between about 2% to about 20% of at least one pigment by total weight of the base color composition; (c) between about 18 to about 25% of an extending agent by total weight of the base color composition; (e) between about 0.5% to about 2% of a thickener by total weight of the base color composition; and (f) between about 1% to about 10% by weight of at least one additive by total weight of the base color composition.

5. The method of claim 3, wherein the base color composition comprises at least two pigments.

6. The method of claim 3, wherein the base color composition comprises at least three pigments.

7. The method of claim 3, wherein the base color composition comprises four pigments.

8. The method of claim 2, wherein the at least two dispersed pigment compositions further comprises a third dispersed pigment composition, the third dispersed pigment composition comprising (a) between about 72% to about 90% of water by total weight of the third dispersed pigment composition; (b) between about 3% and about 8% of a colloid-forming agent by total weight of the third dispersed pigment composition; (c) between about 0.4% to about 7% of a third pigment by total weight of the third dispersed pigment composition; (d) between about 4% to about 8% of an extending agent by total weight of the third dispersed pigment composition; (e) between about 0.2% to about 0.5% of a thickener by total weight of the third dispersed pigment composition; and (f) between about 0.5% to about 4% by weight of at least one additive by total weight of the third dispersed pigment composition.

9. The method of claim 2, wherein the additive is selected from the group consisting of preservatives, surfactants, stabilizers, and defoaming agents.

10. The method of claim 2, wherein the resin is a carboxylated styrene acrylic polymer.

11. The method of claim 2, wherein the resin is a provided as a colloidal dispersion.

12. The method of claim 2, wherein the thickener comprises hydroxyethylcellulose.

13. The method of claim 2, wherein the resin composition has a viscosity ranging from between about 15000 cps to about 25000 cps.

14. The method of claim 2, wherein the colloid-forming composition has a viscosity ranging from between about 500 cps to about 850 cps.

15. A coating produced by continuously applying a layer of the multicolor paint composition of claim 1, and then drying the layer.

16. The coating of claim 15, wherein the step of applying the layer comprises spraying the multicolor paint composition onto a substrate.

17. The coating of claim 15, wherein the layer comprises a plurality of different colored pigments.

18. The coating of claim 17, wherein the plurality of differently colored pigments are present in a plurality of different sizes.

19. A method of forming dispersed pigment globules comprising (a) providing a colloid-forming composition comprising water and a gelling agent; (b) providing a base color composition, the base color composition comprising water, at least one pigment, an extending agent, and a thickener; (c) mixing the colloid-forming composition and the base color composition; and (d) passing the mixture of the colloid-forming composition and the base color composition through a sieve, the sieve comprising a series of stacked discs, each disc having a plurality of differently sized mesh openings, wherein a plurality of openings in a top disc are larger than a plurality of openings in a bottom disc.

20. The method of claim 19, wherein the dispersed pigment globules have a size ranging from about 2.5 mm to about 20 mm.

* * * * *